United States Patent [19]
Williams et al.

[11] Patent Number: 5,938,273
[45] Date of Patent: Aug. 17, 1999

[54] VEHICLE ENERGY ABSORPTION

[75] Inventors: Shawn R. Williams, Auburn Hills; James E. Holtslag, Clarkston, both of Mich.; Jeffrey S. Rausch, Graz, Austria; James M. Resovsky, Waterford; Larry W. Bell, Canton, both of Mich.

[73] Assignee: Chrysler Corporation, Auburn Hills, Mich.

[21] Appl. No.: 08/935,416

[22] Filed: Sep. 23, 1997

Related U.S. Application Data

[60] Provisional application No. 60/051,894, Jul. 8, 1997.

[51] Int. Cl.$^6$ .................................................. B60R 21/04
[52] U.S. Cl. ........................................... 296/189; 280/751
[58] Field of Search ............................... 296/189, 146.7, 296/39.1; 280/751, 801.2, 805

[56] References Cited

U.S. PATENT DOCUMENTS

| | | |
|---|---|---|
| 3,181,849 | 5/1965 | Mitchell . |
| 3,843,182 | 10/1974 | Walls et al. . |
| 3,871,636 | 3/1975 | Boyle . |
| 3,938,841 | 2/1976 | Glance et al. . |
| 4,050,726 | 9/1977 | Hablitzel . |
| 4,073,528 | 2/1978 | Klie . |
| 4,925,224 | 5/1990 | Smiszek . |
| 4,951,986 | 8/1990 | Hanafusa et al. . |
| 5,340,178 | 8/1994 | Stewart et al. . |
| 5,382,051 | 1/1995 | Glance . |
| 5,433,478 | 7/1995 | Naruse ..................................... 280/751 |
| 5,573,272 | 11/1996 | Teshima .................................. 280/751 |
| 5,641,195 | 6/1997 | Patel et al. ............................... 296/189 |
| 5,660,426 | 8/1997 | Sugimori et al. .................. 296/39.1 X |

*Primary Examiner*—Joseph D. Pape
*Attorney, Agent, or Firm*—Kenneth H. Maclean

[57] ABSTRACT

An energy absorption system for vehicle pillars. The energy absorption system includes a cover device attached to a pillar having an outer shell or side visible from the vehicle interior and an inner hidden side supporting a ladder-like structure which includes a spaced walls and spaced ribs integrally attached together. During energy absorption, the side walls absorb energy by bowing outward away from the ribs and occasionally tearing while energy is also absorbed by crushing distortion and tearing of the ribs from their attachment with the walls. Moreover, in an embodiment, at least one flow channel or passage for air is formed within the device laterally to the side of one of the walls. In another embodiment in which a seat belt attachment is utilized, the device forms a track for a slidable retention belt retention member.

8 Claims, 3 Drawing Sheets

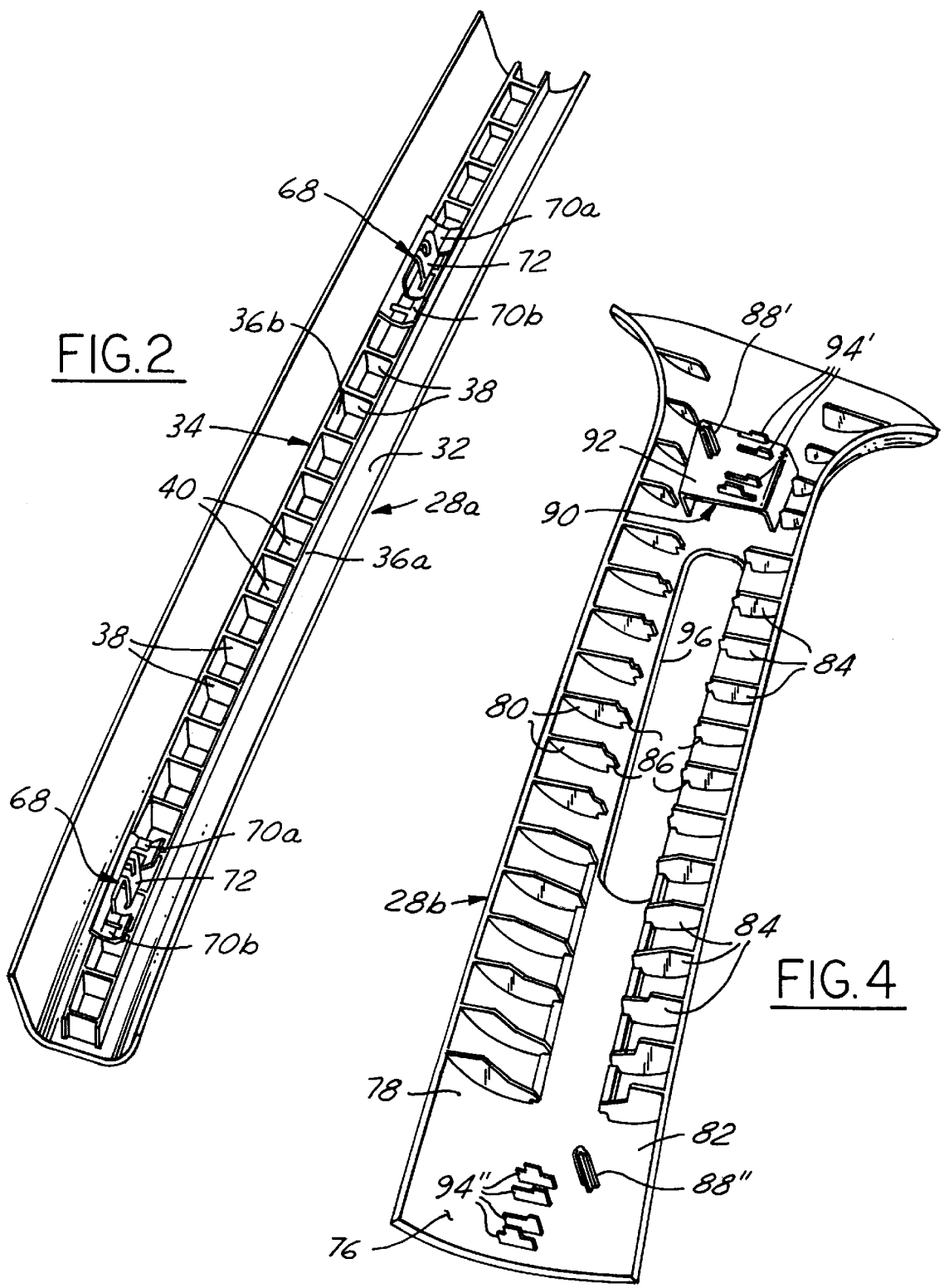

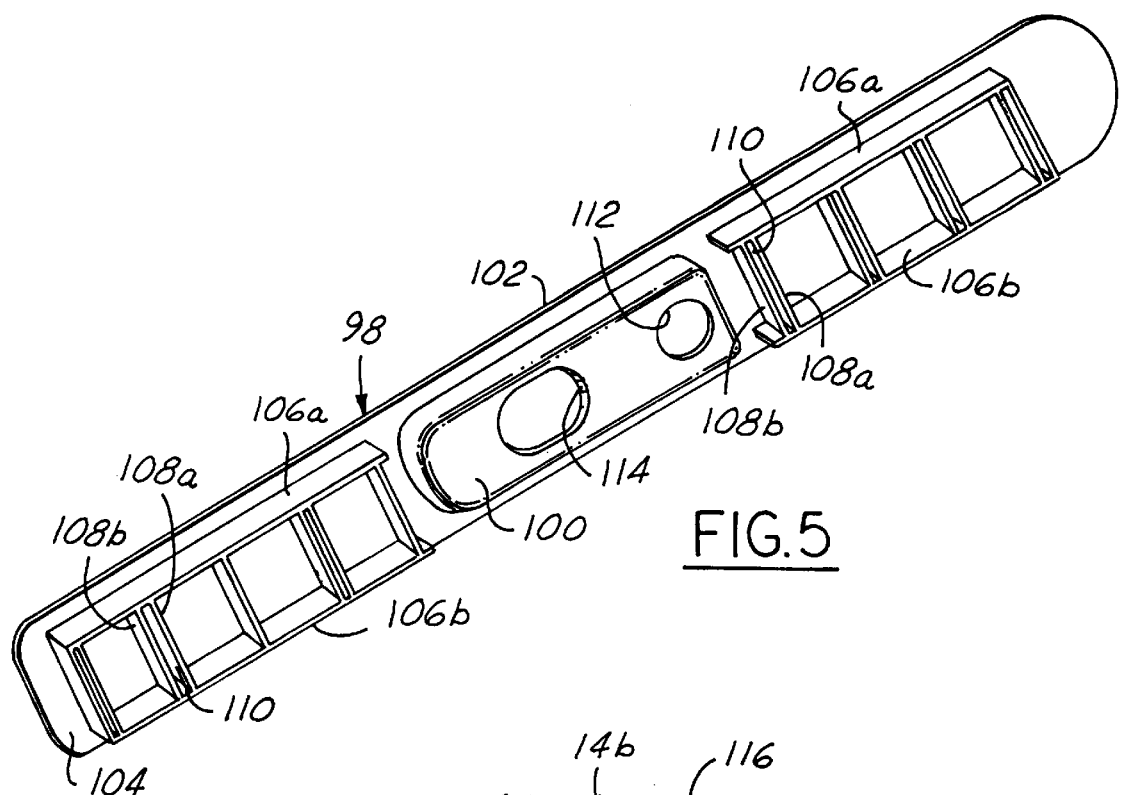
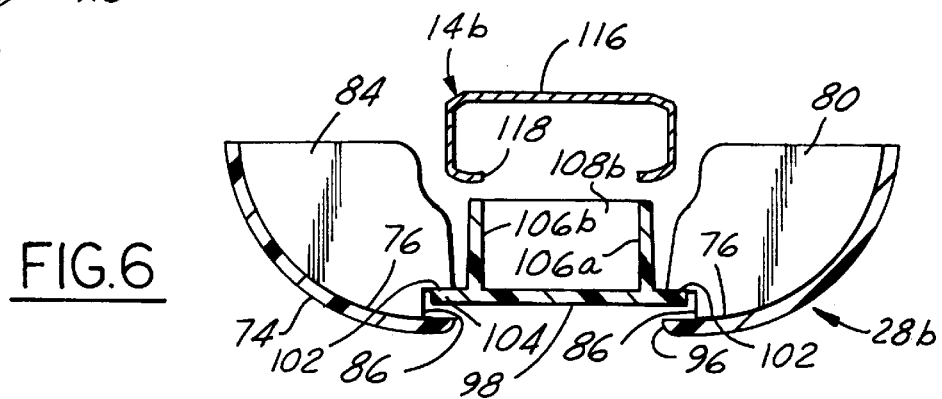
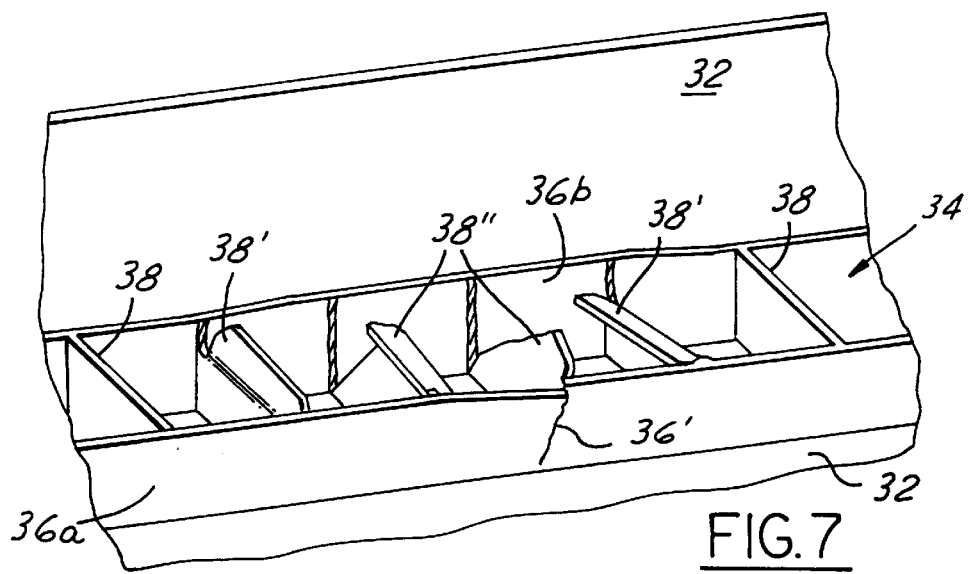

5,938,273

VEHICLE ENERGY ABSORPTION

RELATED APPLICATIONS

This application claims the benefit of U.S. Provisional application Ser. No. 60/051,894, filed Jul. 8, 1997 by U.S. Post Office Express Mail.

BACKGROUND

1. Field of the Invention

The present invention relates generally to devices subject to impacts and more particularly to an energy absorption system for impacts imparted to a pillar of a vehicle.

2. Description of the Related Art

Vehicles typically utilize structural and roof support pillars which are generally vertically oriented or slanted from the vertical. These support pillars are disposed, for example, along each side of the vehicle and may be located to separate a pair of vehicle windows as well as to define a door frame. It is common in the industry to designate each generally vertical pillar by a name starting from the forward most roof pillar at the front of the vehicle. For example, the first pillar is designated the "A" pillar, the next rearward or second pillar is designated the "B" pillar, and so forth. Prior to the subject invention, different types of energy absorption devices have been mounted on these pillars but generally have been difficult to produce and they added undesirable weight to the vehicle. In the industry, it would therefore be desirable to have a relatively inexpensive, lightweight energy absorption system for the pillars of the vehicle.

SUMMARY OF THE INVENTION

The present invention eliminates the oversights, difficulties, and disadvantages of the prior art by providing an energy absorption system for various pillars of a vehicle. The energy absorption system includes a device attached to a pillar that includes an outer or external shell or surface integral to a hidden ladder-like structure disposed thereunder. The device also includes a plurality of longitudinally spaced ribs attached between two of the device's side walls. Upon being impacted, the ribs absorb energy by deforming and being torn away from the side walls. Also, at the same time the side walls absorb energy by bowing outward away from the ribs and may also be otherwise deformed. Moreover, the device includes two air flow channels are formed on each side of the side walls positioned opposite the attached ribs for passage of air therethrough. The passage of air also absorbs energy.

Even for a pillar which is requiring to support the upper portion of a seat belt, a slidable retention member is provided in the device that includes a plurality of longitudinally spaced ribs, disposed between, and attached to, a set of side walls of the seat belt retention system. Upon an impact against the retention member, the ribs absorb energy by being distorted and being torn away from the side walls and the side walls are bowed outward away from the ribs and otherwise distorted.

Other objects, features and advantages of the present invention will become apparent by reference to the following detailed description when considered in conjunction with the accompanying drawings.

BRIEF DESCRIPTION OF THE DRAWINGS

FIG. 2 is a perspective view of the "A" pillar device showing an internal ladder-like structure including energy absorbing ribs; FIG. 4 is a perspective view of the "B" pillar energy absorption device of the internal side thereof revealing a plurality of energy absorbing ribs; and FIG. 5 is a perspective view of a slidable seat belt retention member of the present invention; and FIG. 6 is a cross-sectional view of the "B" pillar device taken along section line 6—6 in FIG. 1; and FIG. 7 is a perspective view of the "A" pillar device after being impacted and showing the ribs distorted and torn away from the side wall of the ladder-like structure.

DESCRIPTION OF THE PREFERRED EMBODIMENT(S)

Figure 1:
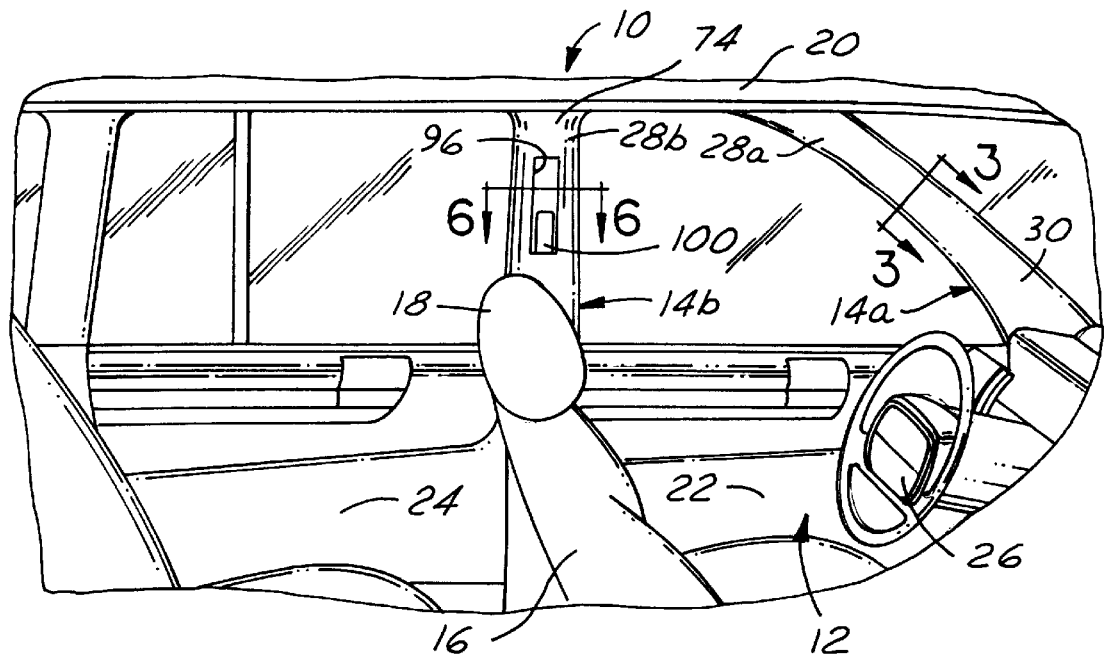
FIG. 1 is a perspective view of an interior of a vehicle showing an "A" pillar energy absorption device to the right and a "B" pillar energy absorption device.

In FIG. 1, a partial view if a vehicle 10 is shown including an interior 12 with an energy absorption system particularly for attachment to an "A" pillar 14a and a "B" pillar 14b. Interior 12 includes seating for a driver including a seat back 16 and a headrest 18 mounted thereon. The "A" pillar 14a partially supports a vehicle roof structure 20 and partially defines a frame for a driver's side front door 22. The "B" pillar 14b also partially supports roof structure 20 and partially defines the frame for the driver's side front door 22 as well as the driver's side rear door 24. A steering wheel 26 is located forward of the seat back 16.

Figure 3:
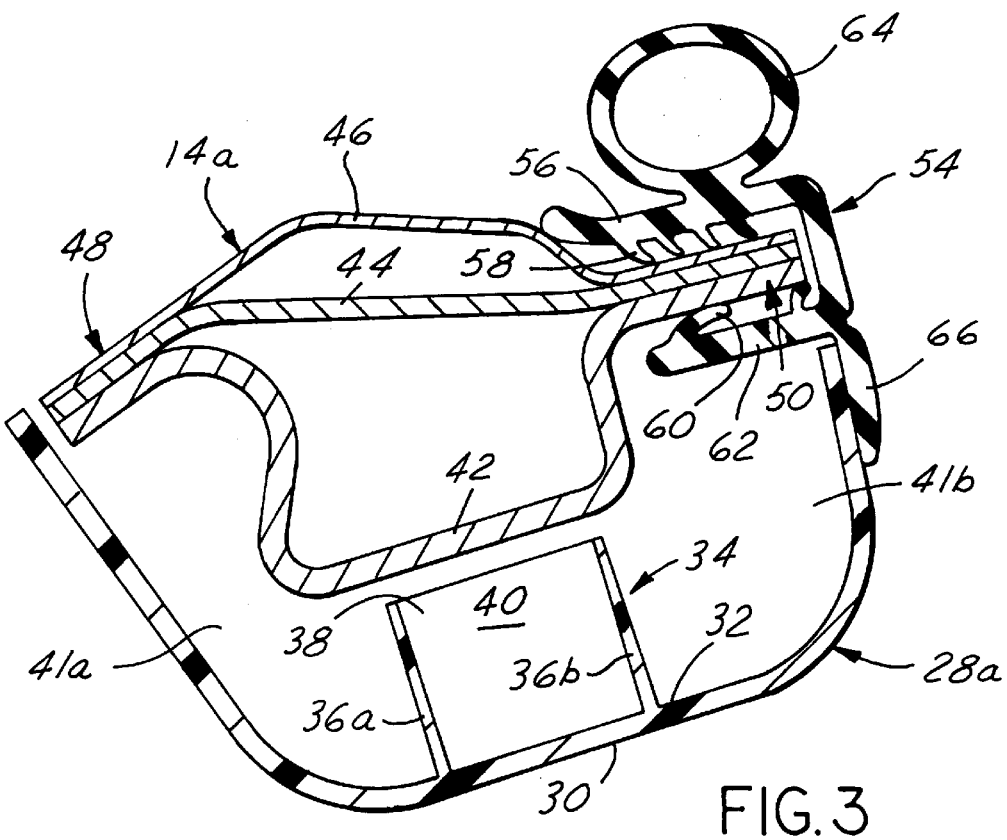
FIG. 3 is a cross-sectional view of the "A" pillar device taken along section line 3—3 in FIG. 1.

Mounted to "A" pillar 14a is energy absorption device 28a, the specific configuration of which is perhaps best understood by referring to FIGS. 2 and 3. The device 28a is a molded, thin-walled component with an outer or exterior surface 30 and an inner or hidden surface 32. Specifically, the device 28a is molded of high impact plastic material with inner surface 32 configured as perhaps best shown in FIG. 2 revealing a ladder-like structure 34. When distorted and torn by exteriorly applied energy, the ladder-like structure 34 absorbs energy. Specifically, the ladder-like structure 34 is attached to the inner or hidden surface or side 32 of the device 28a and includes two laterally spaced side wall portions 36a and 36b. A plurality of longitudinally spaced ribs 38 are each disposed between, and integrally attached to, the side walls 36a and 36b. Defined between each set of ribs 38 is a pocket 40. Also, a pair of channels 41a and 41b are formed to each side of walls 36a and 36b. These channels 41a and 41b can flow air if necessary for a purpose such as for defrosting the vehicle window or for providing air vent channels generally.

As best shown in FIG. 3, the device 28a overlies an elongated inner structural member 42 which forms part of the "A" pillar 14a. The pillar 14a also includes a central structural member 44 and an outer structural member 46. The side edges of members 42, 44, 46 are in overlying and abutting relation to one another and are joined together preferably by spot welds (not shown) to form combined edge portions 48 and 50. The rightward edge 50 of the pillar members 42, 44, 46 supports a generally "C" shaped portion 52 of a rubber door seal assembly 54. Specifically, the "C" shaped portion 52 is formed by a first elongated extension 56 that has a plurality of projections or "teeth" 58 disposed thereon to increase a frictional engagement of the extension with the edge portion 50. Likewise, the opposite side of the edge portion 50 is engaged by similar teeth 60 formed on a parallel extension 62 of the seal assembly 54. Seal assembly also has a sealing portion 64 adapted to engage with the window of the driver's side door 22 when both are closed. The sealing portion 64 has a generally "O"-shaped cross-section. In addition, the seal assembly 54 includes a trim portion 66 which extends over and covers the edge of the outer surface 30 of the device 28a.

As perhaps best shown in FIG. 2, the energy absorption device 28a has a retention mechanism or clip 68 attached to the ladder-like structure. Specifically, the clip 68 is attached to the device 28a by retention stakes 70a and 70b that engage side walls 36a, 36b. The retention clip 68 further includes a retention tab 72 designed for insertion into a specified part of the inner member 42 of the "A" pillar 14a for securing the device 14a to the vehicle.

Referring again to FIG. 1, an energy absorption device 28b is shown which covers "B" pillar 14b. Like the previously described device 28a, this device 28b has an elongated configuration as seen in FIG. 4. The device 28b has an outer or external surface 74 facing the vehicle interior 12 and an opposite inner or hidden surface 76. The inner surface 76 has a side portion 78 with a plurality of arcuate and longitudinally spaced ribs 80 extending therefrom. At the opposite side portion 82, a similarly formed series of ribs 84 extend from surface 76. Many of the ribs 80 and 84 include a notch 86 located adjacent to where the rib is connected to the main body of the device at surface 76. The device 28b includes a pair of projections or retention prongs 88' and 88", spaced longitudinally from one another, one at each end. The upper prong 88' extends outward from a raised table 90 having a surface 92 spaced outwardly from surface 76. Adjacent to prong 88', a series of retention flanges or tabs 94' extend from table surface 92. At the lower end of device 28b, a series of similarly formed retention tabs 94" extend directly from surface 76 as does the adjacent prong 88". The prongs 88', 88" and tabs 94', 94" are adapted to engage receptive structure of the "B" pillar 78b to retain the device 14b to the pillar.

Further disposed or formed through the body of the device 14b is an elongated aperture 96 as best shown in FIG. 4. The embodiment of the device for the "B" pillar includes a slidable seat belt retention member 98, a center part 100 of which is designed to be exposed through the elongated aperture 96. Belt retention member 98 further includes a back side 102 adapted to be covered by the overlapping edge portions of device 14b which frame the aperture 96. The seat belt retention member 88 also has a base portion 104 that is slidably disposed within a track formed along the edges of the aperture 96 by the notches 86 formed in ribs 80 as seen in FIG. 6. The seat belt retention member 98 further includes two sets of paired and laterally spaced walls 106a and 106b. A plurality of longitudinally spaced ribs 108a and 108b are formed between walls 106a and 106b. Disposed between each pair of ribs 108a and 108b is a void or space 110 that provides somewhat of a pneumatic cushion upon movement of ribs 108a and 108b. An upper seat belt support structure is adapted to be attached through the retention member 98 and specifically through its midportion 100 which is exposed through aperture 96. For this purpose, apertures 112 and 114 are disposed through this midportion or central structure 100 to receive the shoulder harness seat belt structure. To absorb energy, the side walls 106a and 106b are bowed outward from the associated and attached ribs 108a and 108b. Moreover, distortion and tearing of the ribs 108a and 108b also absorb energy as the ribs and side walls are separated either partially or entirely.

As is best shown in FIGS. 1 and 6, the edges along the back or inner side 102 of member 98 overlie the edges of aperture 96. The exposed surface 100 of member 98 can be painted or formed of molded plastic to match the interior surfaces of the vehicle. As shown in FIG. 6, the "B" pillar energy absorption device 26b extends along and overlies a pillar member 116. Member 116 is preferably constructed of steel for strength and forms part of the frame of vehicle 18. The seat belt retention structure is anchored to member 116 but is allowed to slide vertically a limited degree through the slot 118 formed therein.

In FIG. 7, the energy absorption device 28a is shown after absorbing energy. Note that at least two of the ribs 38' are partially torn from there attachment with wall 36b and in fact at least two of the ribs 38" are almost totally detached. Also note the separation of wall 36a at location 36'. These distortions and tears absorb energy in a controlled manner.

While the invention has been described in detail, it is to be expressly understood that it will be apparent to persons skilled in the relevant art that the invention may be modified without departing from the spirit of the invention. Various changes of form, design or arrangement may be made to the invention without departing from the spirit and scope of the invention. Therefore, the above mentioned description is to be considered exemplary, rather than limiting, and the true scope of the invention is that defined in the following claims.

What is claimed is:

1. An energy absorption system for use along an "A" pillar and along a "B" pillar of a vehicle, the energy absorption system comprising:

an "A" pillar elongated device defining an outer side visible from the vehicle interior and an opposite inner hidden side having a ladder-like structure attached thereto, the ladder-like structure including two laterally spaced side wall portions and a plurality of longitudinally spaced ribs each disposed between and integrally attached to the side walls, a pair of longitudinally spaced retention means for attaching said device to the associated "A" pillar, and wherein during energy absorption the ribs are crushingly distorted and tearing can occur between the ribs and the side walls, while the side walls can absorb energy by bowing outward away from one another and being torn;

a "B" pillar elongated device having an outer side surface visible from the vehicle interior and an opposite inner hidden side surface supporting a first row of longitudinally spaced ribs integrally attached to hidden side and supporting a second row of longitudinally spaced ribs integrally attached to the hidden side, said first row being laterally spaced from said second row, the ribs of said first and second rows of ribs having a notched configuration adjacent the connection with said hidden side surface, thereby defining a track, retention means for attaching said device to the "B" pillar at longitudinally opposed ends including retention members attached to the rib supporting hidden side and two longitudinally spaced prongs, wherein during energy absorption the ribs are crushingly distorted; and a seat belt retention member having a base portion slidably disposed within said track, two sets of laterally opposed side walls, a plurality of longitudinally spaced ribs each disposed between, and integrally attached to, each set of side walls of the seat belt retention member, and a seat belt support structure attached to the base and disposed between the sets of side walls.

2. The energy absorption system of claim 1 further including at least one air passage channel formed lateral to one of the side walls for the passage of air therethrough.

3. An energy absorption system for use over a pillar in a vehicle interior, the energy absorption system comprising:

an elongated shell device having an outer side defining a surface visible from the vehicle interior, an inner side hidden from the vehicle interior and supporting a first row of longitudinally spaced ribs integrally attached to the inner side, and supporting a second row of longitudinally spaced ribs integrally attached to the inner side, said first row being laterally spaced from the second row, the ribs in said first and second rows having opposed notch formations to define a track therebetween, a seat belt retention member with a base portion slidably disposed within the track wherein said seat belt retention member further includes two sets of laterally opposed side walls aligned with one another and a plurality of longitudinally spaced ribs each disposed between and integrally attached to each set of said laterally disposed side walls.

4. An energy absorption system for use over a pillar in a vehicle interior comprising:

an elongated thin wall shell component having an outer surface visible from the vehicle interior and an inner surface hidden from the vehicle interior, an elongated aperture formed in the thin wall of said shell and extending along the length thereof, a first row of longitudinal extending ribs spaced from one another and integrally attached to the inner surface extending along one side of said aperture, a second row of longitudinally extending ribs spaced from one another integrally attached to the inner surface and extending along the other side of said aperture, said first row of ribs being laterally spaced from the second row of ribs, said first and second row of ribs being deformed in response to the impact load directed onto said shell to dissipate energy from said impact, said ribs in said first and second rows having opposed notches formed therein to define an elongated track therebetween, and a seat belt retainer mounted within said shell for sliding motion along said track.

5. The energy absorption system of claim 4 wherein said shell component has a plurality of retention devices attached thereto, each of said devices having longitudinally spaced retention tabs and prongs for attaching said shell component to an associated pillar.

6. The energy absorption system of claim 4 wherein said seat belt retainer has a flattened base portion with longitudinal sides slidably disposed within said track and with a visible center part extending through said aperture in said shell.

7. The energy absorption system of claim 4 wherein said seat belt retention member has a plurality of open cells which deflect to absorb the energy of a load applied thereto.

8. The energy absorption system of claim 7 wherein said ribs of said open cells are crushingly distorted and torn from the sidewalls to dissipate the energy of an impact load.

* * * * *